United States Patent

Dodd et al.

[11] Patent Number: 5,971,928
[45] Date of Patent: Oct. 26, 1999

[54] DIAGNOSTIC MEDICAL ULTRASONIC SYSTEM AND METHOD FOR IMAGE SUBTRACTION

[75] Inventors: Stirling S. Dodd, San Jose; Brian M. Normand, San Ramon, both of Calif.

[73] Assignee: Acuson Corporation, Mountain View, Calif.

[21] Appl. No.: 09/184,749

[22] Filed: Nov. 2, 1998

[51] Int. Cl.[6] .................................................. A61B 8/00
[52] U.S. Cl. .......................................................... 600/458
[58] Field of Search .................................... 600/458, 440, 600/459, 447; 310/317; 429/9.52; 424/9.52; 367/138

[56] References Cited

U.S. PATENT DOCUMENTS

| | | | |
|---|---|---|---|
| 5,255,683 | 10/1993 | Monaghan | 600/458 |
| 5,456,257 | 10/1995 | Johnson et al. | |
| 5,526,816 | 6/1996 | Arditi | 600/458 |
| 5,577,505 | 11/1996 | Brock-Fischer et al. | |
| 5,595,179 | 1/1997 | Wright et al. | |
| 5,694,937 | 12/1997 | Kamiyama | |
| 5,706,819 | 1/1998 | Hwang et al. | 600/458 |
| 5,833,613 | 11/1998 | Averkiou et al. | 600/440 |

FOREIGN PATENT DOCUMENTS 0 770 352 A1   5/1997   European Pat. Off.

OTHER PUBLICATIONS

Sanjiv Kaul, MD, *Myocardial Contrast Echocardiography 15 Years of Research and Development*; 1997; pp. 3745–3760.

P.N. Burns, J.E. Powers, D. Hope Simpson, A. Brezina, A. Kolin, C.T. Chin, V. Uhlendorf and T. Fritzsch; *Harmonic Power Mode Doppler Using Microbubble Contrast Agents: An Improved Method and Small Vessel Flow Imaging;* 1994; pp. 1547–1550.

Primary Examiner—William E. Kamm
Assistant Examiner—Maulin Pater
Attorney, Agent, or Firm—Craig A. Summerfield; Brinks Hofer Gilson & Lione

[57] ABSTRACT

A patient is first injected with a contrast agent. A complete scan along a plurality of scan lines is then performed, resulting in the destruction of some contrast agent. While some of the contrast agent is destroyed, non-scanned portions of the target, and possibly the scan region, still include at least some contrast agent. A second scan is then sequentially performed sufficiently close in time to the first scan such that reflections from the anatomy remain unchanged. The second frame of data from the second scan will differ from the first frame of data from the first scan by only contrast agent effects. The second frame of data is subtracted from the first frame of data. The resulting data is used to image the contrast agent. By varying the time between each pair of scans, differences in the speed of the contrast agent motion within the body may be assessed. The collateral damage of contrast agents from ultrasound acoustic energy is minimized while the degradation due to various changes is also minimized.

20 Claims, 4 Drawing Sheets

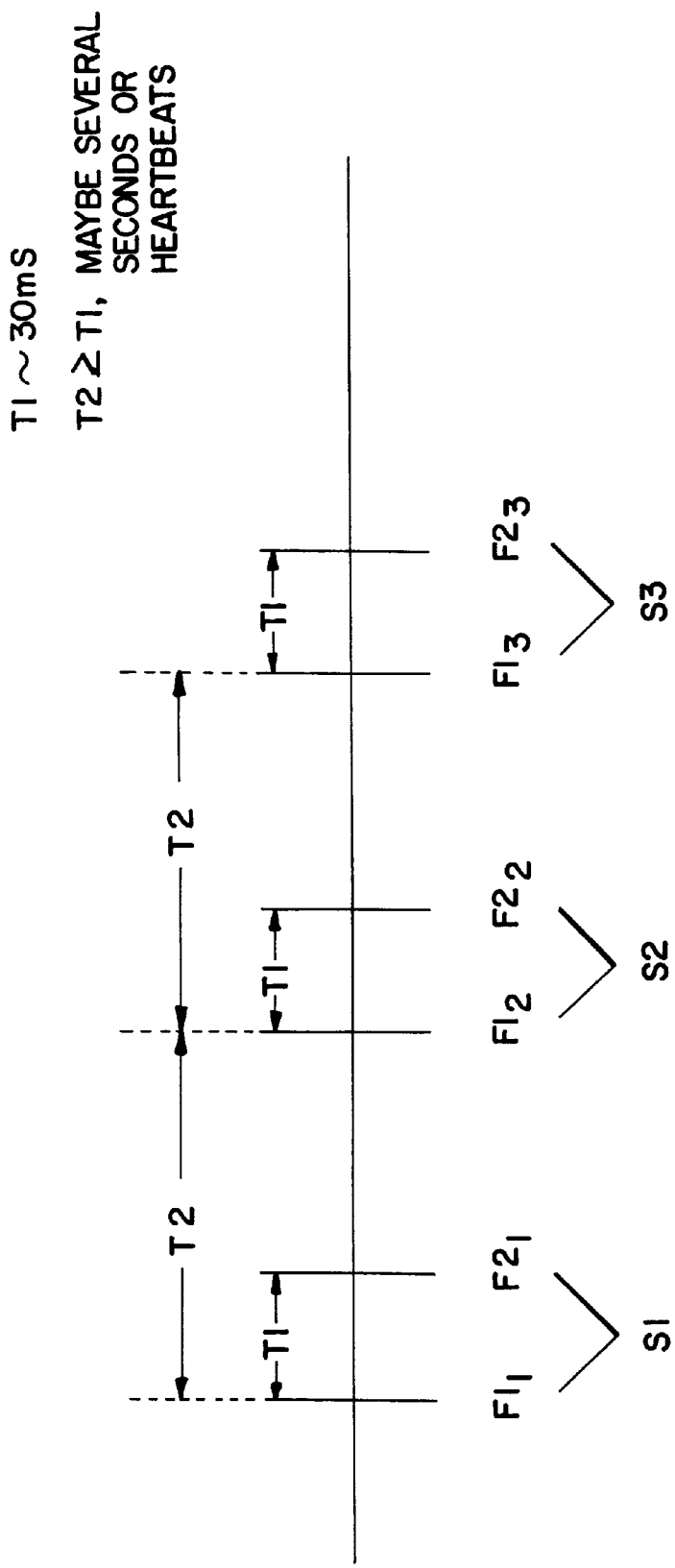

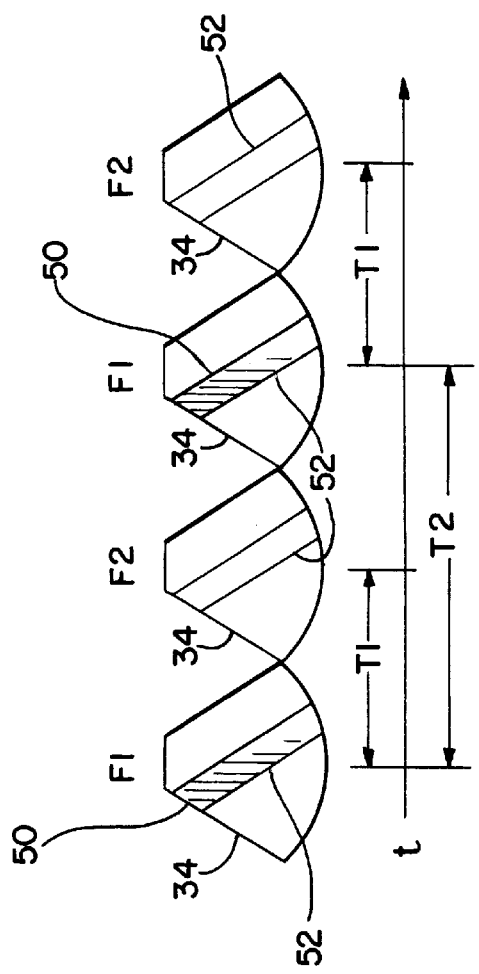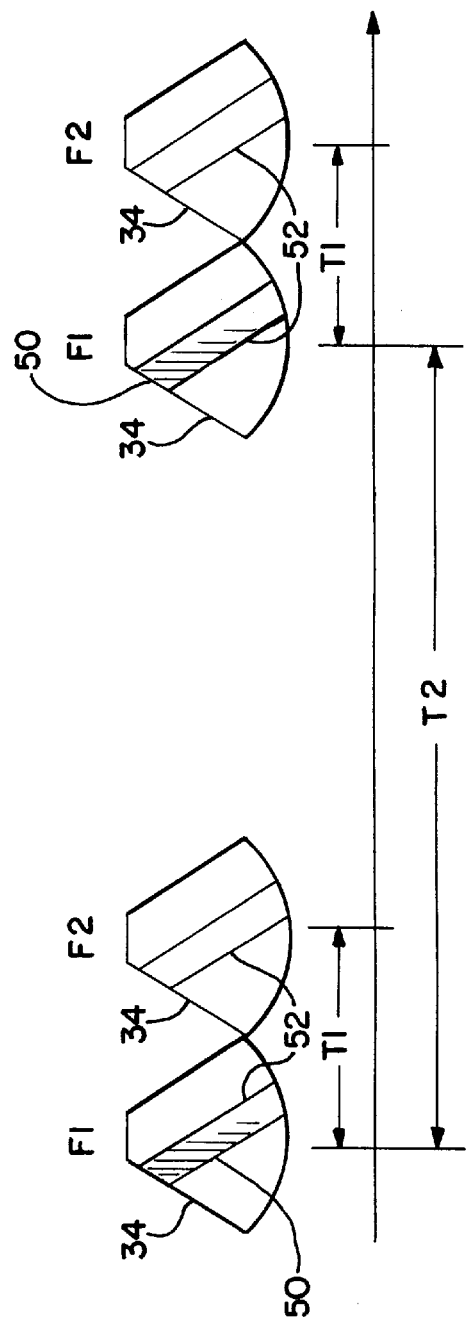

DIAGNOSTIC MEDICAL ULTRASONIC SYSTEM AND METHOD FOR IMAGE SUBTRACTION

BACKGROUND OF THE INVENTION

This invention relates to an Ultrasound System and Method for Image Subtraction. In particular, a system and method for image subtraction during contrast agent imaging is disclosed.

Ultrasound systems image anatomy in various modes, such as B-mode imaging. Various aspects of imaging may be enhanced through the injection of contrast agents. The contrast agents may provide more intense echo signals at either fundamental or harmonic frequencies. Since the contrast agents flow through the various arteries, vessels and capillaries, B-mode imaging may be used to identify blood flow and perfusion. However, as acoustic energy from an ultrasound wave interacts with contrast agents, the contrast agents are destroyed or are altered to provide echo signals with a lesser intensity from contrast agents.

One method takes advantage of the destruction of contrast agents. Two successive firings are transmitted along a scan line before any transmission along another scan line. The first transmission results in the destruction of contrast agent and the second transmission results in echoes with little or no intensity provided from contrast agents. The data associated with the second transmission is subtracted from the data associated with the first transmission. This methodology is then repeated for a plurality of scan lines on a scan line by scan line basis to generate an image. See for example U.S. Pat. No. 5,456,257 to Johnson et al. and European Patent Application EP 0 770352. In one embodiment, a difference in frequency characteristics instead of B-mode intensity is obtained. However, line by line subtraction leads to increased collateral destruction of contrast agents along adjacent lines. As the transmissions are swept through the image plane, the multiple transmissions for each scan line multiply the collateral damage or destruction of contrast agent along an adjacent scan line. The intensity values associated with the first transmission along the second or adjacent scan line may underestimate the concentration of contrast agent.

In another method of contrast agent imaging, a frame of intensity data associated with a plurality of scan lines is obtained prior to the injection of contrast agent. The contrast agent is then injected. A second frame of data associated with the plurality of scan lines is obtained. The second frame of data is subtracted from the first frame of data to generate a frame of image data. See for example U.S. Pat. No. 5,255,683 to Monaghan. However, the delay between obtaining the first frame of data and the second frame of data after the contrast agent perfuses or otherwise flows into the target region may cause degradation due to changes in transducer position, motion in the anatomy and motion associated with the patient positioning or breathing.

SUMMARY

The present invention is defined by the following claims, and nothing in this section should be taken as a limitation on those claims. By way of introduction, the preferred embodiment described below includes a method and system for imaging contrast agents in a target. A patient is first injected with a contrast agent. A complete scan along a plurality of scan lines is then performed, resulting in the destruction of some contrast agent. While some of the contrast agent is destroyed, non-scanned portions of the target, and possibly the scanned region, still include at least some contrast agent. A second scan is then sequentially performed sufficiently close in time to the first scan such that reflections from the anatomy remain unchanged. The second frame of data from the second scan will differ from the first frame of data from the first scan by only contrast agent effects. The second frame of data is subtracted from the first frame of data. The resulting data is used to image the contrast agent. By varying the time between each pair of scans, differences in the speed of the contrast agent motion within the body may be assessed. The collateral damage of contrast agents from ultrasound acoustic energy is minimized while the degradation due to various changes is also minimized.

Further aspects and advantages are discussed below in conjunction with the preferred embodiments.

BRIEF DESCRIPTION OF THE DRAWINGS

FIG. 3 is a timing diagram showing the relationship between various pairs of frames of data.

FIGS. 4A and 4B represent images associated with frames of data obtained using a varying duration between pairs of scans.

DETAILED DESCRIPTION OF PREFERRED EMBODIMENTS

In a preferred embodiment, imaging of contrast agents in a target begins with the injection of a contrast agent into the target. As used herein, "target" includes any patient, tissues or other structures, including non-imaged areas of the patient, tissue or other structure. After the contrast agent has been given time to flow to or perfuse through the target, a first frame of data associated with a plurality of scan lines and a region of the target is obtained. As used herein, a frame of data includes any collection of data associated with a plurality of scan lines and any of various coordinate systems. After obtaining the first frame of data, a second frame of data associated with a second plurality of scan lines, such as the same scan lines as the first plurality of scan lines, in the region of the target is obtained. Combination data is generated as a function of the difference between the first and second frames of data. An image is generated from the combination data.

Figure 1:
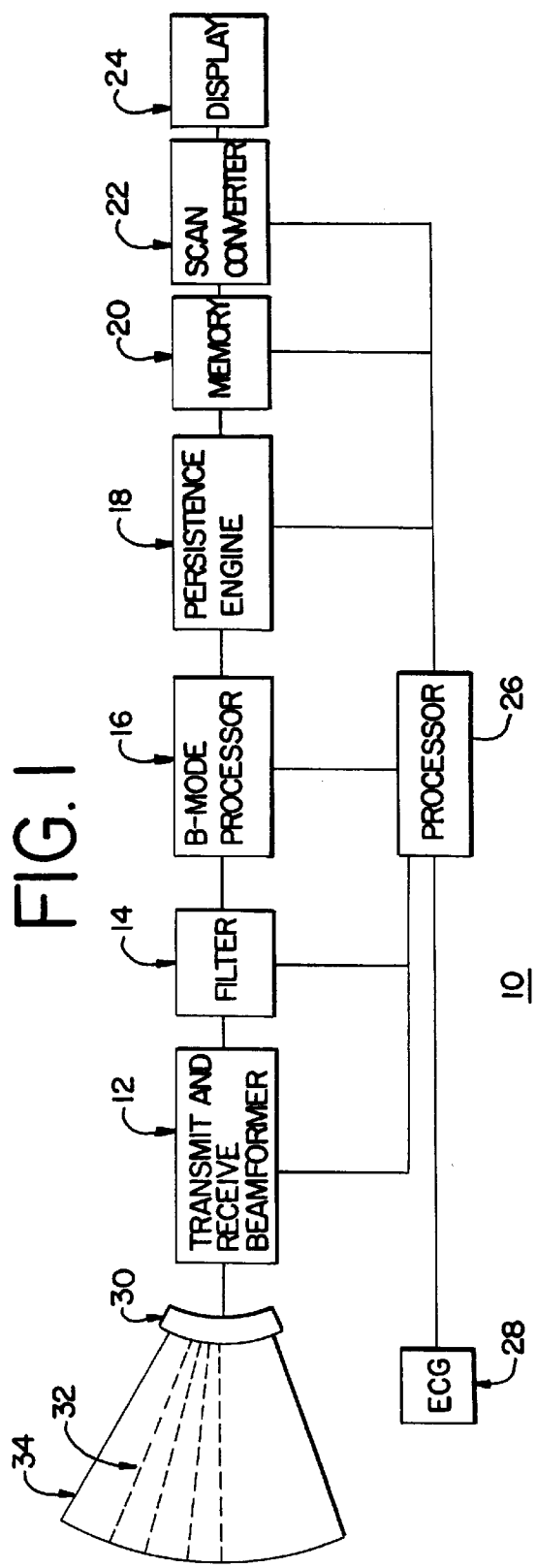
FIG. 1 is a block diagram of an ultrasound system for imaging contrast agents in a target.

Referring to FIG. 1, an ultrasound system for imaging contrast agents in the target is generally shown at 10. The system includes a transducer 30, a transmit and receive beamformer 12, and filter 14, a B-mode processor 16, a persistence engine 18, a memory 20, a scan converter 22, and a display 24 connected as an ultrasound data path. A processor 26 interacts with the ultrasound data path and a user interface or other input devices, such as an ECG 28. Other ultrasound systems, including additional or fewer components or components in a different order, may be used. For example, the B-mode processor 16 may be replaced with a Doppler processor or a Doppler processor maybe included in a parallel processing path with the B-mode processor 16.

In one embodiment, the persistence engine 18 is used to subtract one frame of data from another frame of data. Preferably, the persistence engine 18 comprises the adaptive persistence filter 300 as shown in FIG. 3 and as further detailed in U.S. Pat. No. 5,595,179, the disclosure of which is incorporated herein by reference. Other devices, including analog or digital devices, maybe used to implement the subtraction function.

Figure 2:
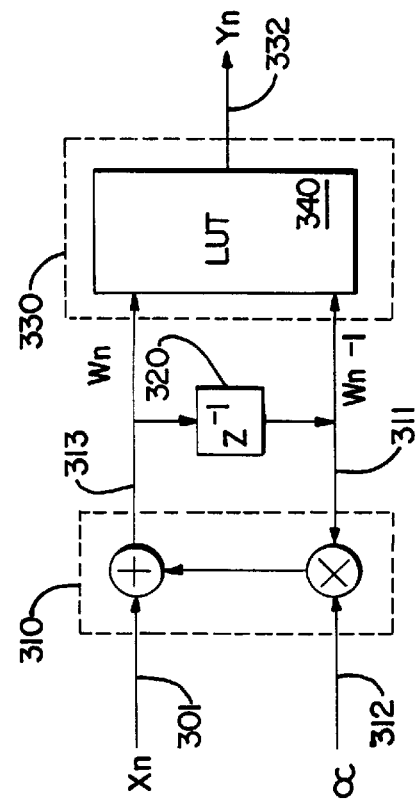
FIG. 2 is a block diagram of a persistence engine for subtracting a first frame of data from a second frame of data.

As shown in FIG. 2, the persistence engine 300 comprises an input port 301 coupled to the recursive stage 310. The recursive stage 310 produces an intermediate value $W_n$ which is delayed in a delay 320. The output of the delay 320 is the previous intermediate pixel value $W_{n-1}$. Thus, the current intermediate pixel value $W_n$ and the previous intermediate $W_{n-1}$ represent corresponding pixel locations of successive frames. The previous intermediate pixel value $W_{n-1}$ is fed back to the recursive stage 310. The current intermediate pixel value $W_n$ and the previous intermediate pixel value $W_{n-1}$ are both also fed forward to a non-recursive stage 330. Preferably, the non-recursive stage 330 comprises a look-up table, such as a RAM or ROM device. The non-recursive stage 330 produces an output pixel value $Y_n$, such as combination data representing a pixel of one frame subtracted from a pixel of another frame.

In one embodiment, the recursive stage merely passes the input value on input 301, and the non-recursive stage subtracts the delayed value from the input value. In this embodiment, is set to 0.0 or the persistence filter 300 is implemented without the recursive stage 310. In other embodiments, $\alpha$ is not 0.0.

In alternate embodiments, other filter structures are used, such as shown in FIG. 2 of U.S. Pat. No. 5,595,179. These filter structures may include various multipliers and adders. Appropriate coefficients are selected for implementing the subtraction function discussed above.

Referring to FIG. 1 and before obtaining the data for input into the persistence engine 18, contrast agent is injected into the target. After waiting for the contrast agent to flow throughout or perfuse the target, the first frame of data is obtained. The transmit beamformer 12 generates a plurality of transmit waveforms to excite the transducer 30. Preferably, the transducer 30 is a wide bandwidth transducer capable of transmitting and receiving acoustic energy. The transducer 30 transmits an acoustic waveform centered at a desired transmit frequency in response to the waveforms from the transmit beamformer 12. The acoustic energy is focused along a scan line 32. By transmitting a plurality of ultrasound acoustic energy waveforms along a corresponding plurality of scan lines 32, a region 34 of a target is scanned. Various scan formats may be used, such as linear or sector. Waveforms may be transmitted along each of the plurality of scan lines 32 in any order, such as sequentially left to right. Preferably, the number of acoustic energy waveform transmissions along any scan line 32 are minimized in order to minimize collateral damage to contrast agents, such as firing only one acoustic energy burst per scan line 32. By scanning the region 34, echo signals for a frame of data obtained.

The frame of data is responsive to echo signals from the transmitted acoustic energy. Preferably, the frame of data comprises B-mode intensity values. In alternative embodiments, the frame of data comprises Doppler values, such as Doppler energy, velocity, variance, or combinations thereof.

The transducer 30 receives wide bandwidth echo signals along each scan line 32. The echo signal is associated with structures within the target, including any contrast agent. The echo signals are amplified and coherently summed by the receive beamformer 12. The filter 14, such as a band pass filter or demodulator with a low pass filter, selects certain frequency bands of the received signals, such as harmonic or fundamental frequency bands. Preferably, the filtered signal is further amplified. The B-mode processor 16 receives the filtered signals, log compresses, envelope detects and further filters the signal. The B-mode processor 16 outputs data associated with the amplitude or intensity of the echo signal. If the data comprises an analog signal, the B-mode processor 16 also preferably converts the signal to a digital signal for storage in the persistence engine 18. In alternative embodiments, the persistence engine 18 operates on analog signals. The receive beam formation, filtering and B-mode processing is repeated along each of the scan lines 32 within the region 34 until a frame of data is stored in the persistence engine 18 or other device for combining data. In alternative embodiments, the frame of data is stored along any portion of the ultrasound data path prior to the persistence engine 18.

After obtaining the first frame of data, a second frame of data is obtained. Preferably the second frame of data is obtained by scanning the same region 34 of the target along the same ultrasound lines 32 as used for the first frame. In alternative embodiments, a different region 34 or different scan lines 32 are used for the second frame. The first frame of data is stored while the second frame of data is acquired.

Referring to FIG. 2, the persistence engine 300 is programmed to subtract the second frame of data from the first frame of data. The first frame of data is stored in the delay 320. The lookup table 340 is programmed to output the difference function F(f1-f2) of the two frames of data f1 and f2 as combination data. In alternative embodiments, three or more frames of data may be used in a function including a subtraction operation. The persistence engine 300 operates on data from the first and second frame corresponding to the same or substantially the same spatial locations. In alternative embodiments, data from the first frame maybe combined with data from the second frame representing a different spatial location, such as to account for movement of the target or to provide spatial averaging.

The persistence engine 300 is programmed to operate pursuant to one of various difference functions. In one embodiment, a scaled or weighted difference combination of the two frames of data is used. Preferably, an unweighted difference function is used.

Referring to FIG. 1, the frame of combination data generated by the persistence engine 18 is stored in the memory 20. Other frames of data, such as the first or second frame of data, may also be stored in the memory 20. In alternative embodiments, one or more of the frames of data by-pass the memory 20 and are scan converted by the scan converter 22. Whether output from the memory 20 or provided from the persistence engine 18, the frames of data are scan converted by the scan converter 22 for display on the display 24. Preferably, the scan converter 22 controls the colors and display format for the frames of data. The scan converted frames of data may also be output to other devices, such as a DIMAQ Digital Storage Device.

The frames of data are displayed side-by-side or overlaid on the display 24. For example, an image derived from the first frame of data is displayed adjacent to an image derived from the second frame of data. The user may then identify differences between the two images. Alternatively, the first or second frame of data is used to generate an image adjacent to an image generated from the combination frame of data. The image associated with the first or second frames of data contains anatomy and other structure that may have been altered or removed by the combination or subtraction process. The image associated with the combination data highlights the differences between the first and second frames of data. As another example, an image associated with the combination frame of data is overlaid on an image associated with the first or second frames of data. Preferably, the image associated with the combination data is color-coded and the image associated with the first or second frames of data is displayed as a black and white image. Both images may be either color-coded or shown in black and white. By displaying the overlaid image in real time, while the contrast agent exam is in progress, the user may immediately recognize the extent of perfusion of the contrast agent into the region of interest or the target.

In one embodiment, a scaled or weighted overlay of two or more images is generated and displayed. For example, the combination data or the image associated with the combination data is multiplied by a scale factor or weight, such as 10. The scaled image is overlaid with an image associated with another frame of data, such as the first frame of data. The image associated with the first frame of data may be scaled, but preferably is not scaled. The overlaid images emphasize the image associated with the combination data while still providing the structural detail associated with the first frame of data. The scaling or weighting is performed using a weighted lookup table or other addition or multiplication devices.

The image responsive to the combination frame of data displays the differences between the first frame of data and the second frame of data. The generation of the first frame of data may cause some of the contrast agent in the target to be destroyed, pushed out of the scanned region or otherwise modified to reflect less intensely. Even though the ultrasonic energy transmission associated with generating the first frame of data destroys or otherwise modifies the contrast agent in the scan region 34, contrast agent still exists in other portions of the target and may exist to a lesser extent in the scanned region 34. If the second frame is acquired shortly after the first frame of data, the second frame of data may include less information attributable to contrast agents. A comparison, either visual or computational (i.e., generating combination data), may show areas where contrast agent was detected.

In a preferred embodiment, triggering is used to control the acquisition of both the first and second frames of data. Referring to FIG. 1, the processor 26 controls various components along the ultrasound signal processing path. In response to a trigger condition, the processor 26 causes the acquisition of the first frame of data, the second frame of data or both frames of data.

The trigger condition is preferably based on an output signal from the ECG monitor 28. In alternative embodiments, a timer or other trigger indication is provided by or to the processor 26. Preferably, the trigger condition is selectable by the user and monitored by the processor 26. For example, an ECG signal threshold crossing is set and the output from the ECG 28 is compared to the threshold, such as to identify peak systole. One or more thresholds or points throughout a cardiac cycle maybe identified as thresholds and compared to the signal from the ECG monitor 28. Once the trigger condition is met, the processor 26 causes the ultrasound system 10 to acquire a complete frame of data. The second frame of data is then acquired in response to a same or a different trigger condition.

For real time imaging, multiple pairs or sets of frames of data and the associated combination frames of data may be repetitively generated. Referring to FIG. 4, a timing diagram of one embodiment for real time imaging is shown. The ultrasound system 10 (FIG. 1) is configured to generate pairs of frames of data $F1_i$ and $F2_i$. These pairs of ultrasound images, such as $F1_i$ and $F2_i$, are subtracted to obtain combination frames of data and an associated images, $S_i$. The temporal relationship of the first and second frames of data is established using two variables T1 and T2, where T1 is the time between obtaining the first and second frames of data within a pair and T2 is the time between successive pairs of frames of data.

Preferably, T1 represents a small amount of time that is constant for the duration of the study. For example, T1 represents a time within the 16–30 millisecond range. Other times maybe used. Preferably, the time T1 is user selectable, and the duration is limited by the time to acquire the first frame of data and initialize the second frame of data. Preferably, T1 is short, to avoid any motion artifacts and reentry or regeneration of contrast agents in the scanned region 34.

Preferably, the time T2 is also user selectable and may vary in duration. The duration may depend on the type of examination. For example, the time T2 may be optimized to capture frames of data at particular phases of the cardiac cycle, such as peak systole or peak distole.

The frames of data, combination frames of data, or associated images may be averaged over time or multiple cycles of duration T2. Various quantities, such as a measure of flow, may be determined from the combination data. If the contrast agents flow slowly within the target, the concentration of the contrast agent 34 in an imaged area or scan region 34 maximizes slowly. If the time T2 is constant, the average of the combination data or difference image intensity is a function of the speed of flow of the contrast agent. The average value of the combination data maybe compared to thresholds to determine a flow rate in a known area.

Figure 5:
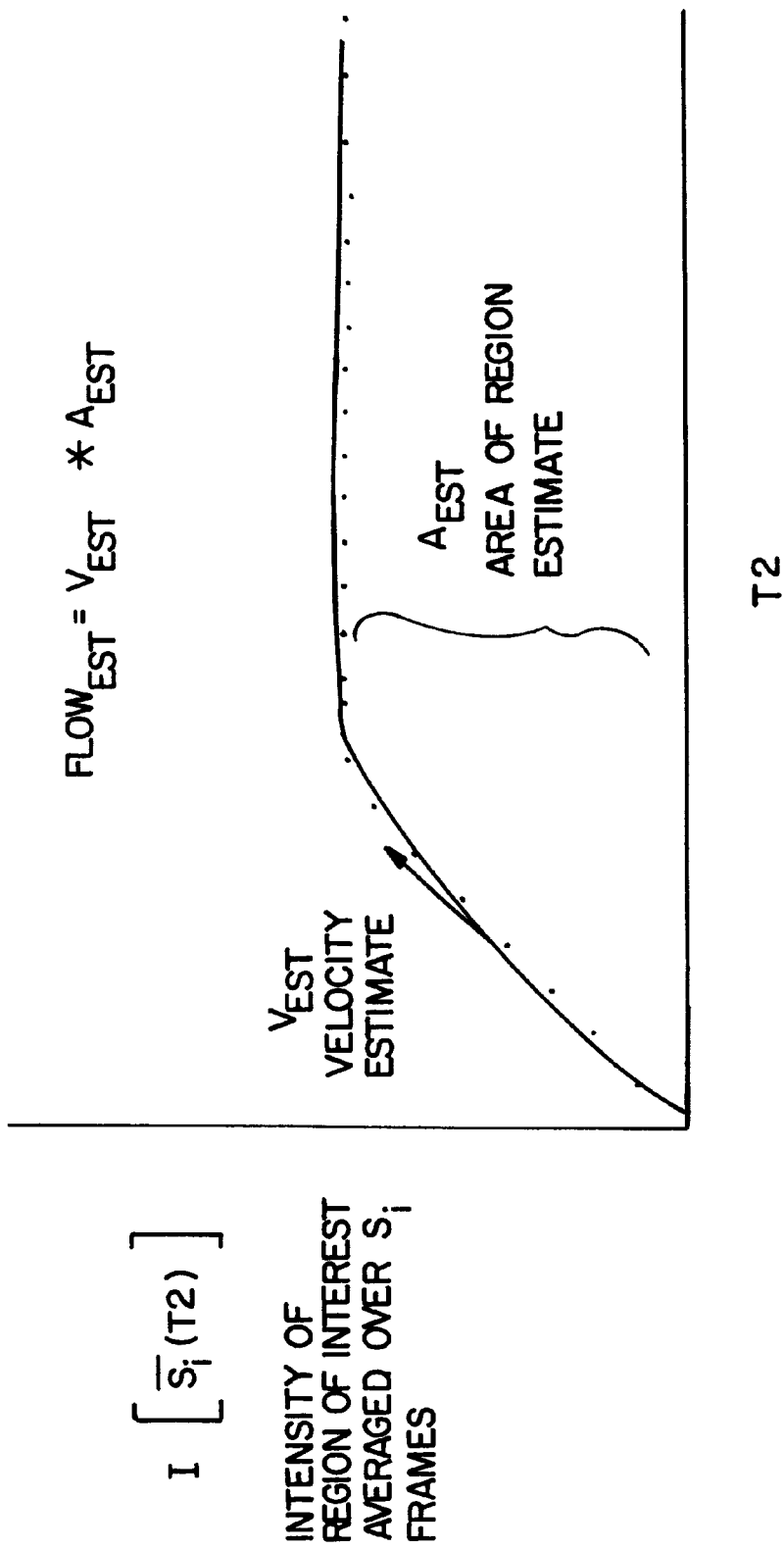
FIG. 5 is a graphical representation of intensities associated with combined data sets as a function of an increasing duration between scans for the combined data sets.

To more accurately determine the flow of contrast agent, the time T2 may be varied. Referring to FIG. 4, a graphical representation of the dependence of contrast agent concentration on the duration of time 12 is shown. As the time T2 is increased, more contrast agents reenter the scanned region 34 between successive image pairs f1 and f2. Referring to FIG. 4A, contrast agents 50 are shown entering about half of the length of a vessel 52 within the scanned region 34 within time T2. Referring to FIG. 4B, contrast agents 50 are shown throughout most of the vessel 52 within the scanned region 34, where time T2 has a longer duration. Because more contrast agent reenters the vessel 50 during a longer duration of T2, the average or total intensity associated with the combination data increases. Referring to FIG. 5, the average or total intensity increases with longer durations of T2 until reaching a maximum value. The slope of intensity as a function of time T2 curve for durations shorter than associated with the maximum intensity is an estimate of the velocity of the contrast agent.

The flow rate of the contrast agent equals the velocity estimate multiplied by the area of the vessel 52. To determine the area, the number of combination data points or associated image pixels above a threshold with the total or average intensity at the maximal value is calculated. The calculated number of pixels or data points is multiplied by the area represented by each pixel or data point to obtain the area.

Referring to FIG. 1, the flow rate of the contrast agent is preferably calculated by the processor 26. The average or total intensity associated with various durations of T2 is stored in memory. In one embodiment, the area is determined by summing the intensities associated with the combination data and comparing the sum total to a threshold. Using the area and a curve generated from the intensity and duration information, the processor 26 determines the flow rate. A value representing the flow rate is displayed on the display 24.

In the embodiments described above, obtaining each frame of data prior to obtaining another frame of data reduces collateral destruction of contrast agents. Any overlapping acoustic energy along one scan line to another scan line is minimized, allowing the first frame to more accurately represent contrast agent within the scanned region. For the second frame of data, much of the contrast agent has been destroyed by the complete scanning for the first frame. By combining the first and second frames, the differences between the associated contrast agents are enhanced. Furthermore, the line spacing and line ordering of the scan lines may be formatted to further limit collateral destruction.

By obtaining the second frame of data immediately after the first frame of data degradation due to movement is minimized. For example, closely timed frames of data may be collected during a stress echo exam when the heart is under stress and beating rapidly. After injection of contrast agents, multiple frames of combination data may be obtained without requiring the time consuming injection of contrast agent between the first and second frames of data.

While the invention has been described above by reference to various embodiments, it will be understood that many changes and modifications can be made without departing from the scope of the invention. For example, various logic or analog multipliers and difference circuitry maybe used at various point throughout the processing path, including during scan conversion, to generate the combination data. The first and second frames of data used for creating the combination data maybe stored at any of various points along the processing path.

It is therefore intended that the foregoing detailed description be understand as a illustration of the presently preferred embodiments of the invention, and not as a definition of the invention. It is only the following claims, including all equivalents, that are intended to define the scope of this invention.

What is claimed is:

1. An ultrasound method for imaging contrast agents in a target wherein the contrast agents have been injected into the target, the method comprising the steps of:
   (a) obtaining with an ultrasound system a first frame of data associated with a first plurality of scan lines in a region of the target after injection of the contrast agent;
   (b) obtaining with the ultrasound system a second frame data associated with a second plurality of scan lines in the region of the target after injection of the contrast agent;
   (c) generating with the ultrasound system combination data as a function of a difference between the first and second frames of data;
   (d) displaying an image responsive to the combination data;
   (e) repeating steps (a), (b) and (c) for at least first and second repetitions, a time between steps (a) and (b) being different for at least said first and second repetitions;
   (f) determining a velocity of flow as a function of the time; and
   wherein the contrast agent remains within at least a portion of the target during steps (a) and (b).

2. The method of claim 1:
   wherein step (a) comprises obtaining first amplitude data associated with one center frequency selected from the group of: fundamental and harmonic center frequencies; and
   wherein step (b) comprises obtaining second amplitude data associated with one center frequency selected from the group of: fundamental and harmonic center frequencies.

3. The method of claim 1 wherein step (b) comprises obtaining the second frame of data within about two heart cycles of step (a).

4. The method of claim 1 wherein steps (a) and (b) are responsive to trigger signals.

5. The method of claim 1 wherein step (c) comprises weighting at least one of the first and second frames of data prior to subtraction.

6. The method of claim 1 further comprising step (g) of displaying an image responsive to one of the first and second frames of data adjacent the image responsive to the combination data.

7. The method of claim 1 wherein step (d) comprises:
   (d1) combining the combination data with one of the first and second frames of data; and
   (d2) displaying the image responsive to step (d1).

8. The method of claim 7 wherein step (d1) comprises the steps of:
   weighting the combination data; and
   summing the weighted combination data with the first frame of data.

9. The method of claim 7 wherein step (d2) comprises displaying the combination data as color values and displaying said one of the first and second frames of data as gray scale values.

10. An ultrasound system for imaging contrast agents in a target, the system comprising:
    means for obtaining a first frame of data associated with a first plurality of scan lines in a region of the target and for obtaining a second frame data associated with a second plurality of scan lines in the region of the target after obtaining the first frame of data;
    a persistence engine for generating combination data associated with a difference between the first and second frames of data and for weighting at least one of the first and second frames of data prior to subtraction; and
    a display for displaying an image responsive to the combination data;
    wherein the contrast agents remain within at least a portion of the target while the first and second frames of data are obtained.

11. The system of claim 10 wherein the means of obtaining comprises a filter and a B-mode processor operative to:
    obtain the first frame of data comprising first amplitude data associated with one center frequency selected from the group of: fundamental and harmonic center frequencies; and
    obtain the second frame of data comprising second amplitude data associated with one center frequency selected from the group of: fundamental and harmonic center frequencies.

12. The system of claim 10 further comprising a trigger processor operatively connected to an ECG monitor, the trigger processor for triggering the means for obtaining.

13. The system of claim 10 further comprising a processor for determining a velocity of flow as a function of the combination data.

14. An ultrasound method for imaging contrast agents in a target wherein the contrast agents have been injected into the target, the method comprising the steps of:

(a) obtaining with an ultrasound system a first frame of data associated with a first plurality of scan lines in a region of the target after injection of the contrast agents;

(b) obtaining with the ultrasound system a second frame data associated with a second plurality of scan lines in the region of the target after step (a);

(c) generating with the ultrasound system combination data as a function of a difference between the first and second frames of data;

(d) displaying an image responsive to the combination data;

(e) repeating steps (a), (b) and (c) for at least first and second repetitions, a time between steps (a) and (b) being equal for at least said first and second repetitions;

(f) determining an average of the combination data associated with each of said repetitions;

(g) determining a velocity of flow as a function of the average; and wherein the contrast agent remains within at least a portion of the target during steps (a) and (b).

15. The method of claim 14 further comprising step (h) of displaying an image response to one of the first and second frames of data with the image responsive to the combination data.

16. An ultrasound method for imaging contrast agents in a target wherein the contrast agents have been injected into the target, the method comprising the steps of:

(a) obtaining with an ultrasound system a first frame of data associated with a first plurality of scan lines in a region of the target after injection of the contrast agents;

(b) obtaining with an ultrasound system a second frame data associated with a second plurality of scan lines in the region of the target after step (a);

(c) generating with an ultrasound system combination data as a function of a difference between the first and second frames of data;

(d) displaying an image responsive to the combination data; and (e) displaying an image response to one of the first and second frames of data with the image responsive to the combination data;

wherein the contrast agent remains within at least a portion of the target during steps (a) and (b).

17. The method of claim 16 wherein step (e) comprises displaying the image responsive to one of the first and second frames of data adjacent the image responsive to the combination data.

18. The method of claim 16 wherein step (e) comprises overlaying the image responsive to one of the first and second frames of data with the image responsive to the combination data.

19. The method of claim 16 further comprising steps:

(f) repeating steps (a), (b) and (c) for at least first and second repetitions, a time between steps (a) and (b) being equal for at least the first and second repetitions;

(g) determining an average of the combination data associated with each of said repetitions; and (h) determining a velocity of flow as a function of the average.

20. The method of claim 16 further comprising steps:

(f) repeating steps (a), (b) and (c) for at least first and second repetitions, a time between steps (a) and (b) being different for at least the first and second repetitions; and (g) determining a velocity of flow as a function of the time.

* * * * *

UNITED STATES PATENT AND TRADEMARK OFFICE
CERTIFICATE OF CORRECTION

PATENT NO. : 5,971,928
DATED : October 26, 1999
INVENTOR(S) : Stirling S. Dodd et al.

It is certified that error appears in the above-identified patent and that said Letters Patent is hereby corrected as shown below:

On the Title Page

In column 2, line 4, please change "and" to --for--.

In column 2, line 7, please change "Pater" to --Patel--.

In column 3, line 25, please insert --$\alpha$-- after "embodiment".

In column 6, line 40, please change "12" to --T2--.

Signed and Sealed this

Seventeenth Day of April, 2001

Attest:

NICHOLAS P. GODICI

Attesting Officer    Acting Director of the United States Patent and Trademark Office